(12) United States Patent
Graddy

(10) Patent No.: US 9,874,438 B2
(45) Date of Patent: Jan. 23, 2018

(54) LASER ANGLE SQUARE ADAPTER

(71) Applicant: Harold W. Graddy, Bartow, FL (US)

(72) Inventor: Harold W. Graddy, Bartow, FL (US)

(*) Notice: Subject to any disclaimer, the term of this patent is extended or adjusted under 35 U.S.C. 154(b) by 203 days.

(21) Appl. No.: 14/971,055

(22) Filed: Dec. 16, 2015

(65) Prior Publication Data

US 2017/0176179 A1 Jun. 22, 2017

(51) Int. Cl.
*G01B 11/26* (2006.01)
(52) U.S. Cl.
CPC .................... *G01B 11/26* (2013.01)
(58) Field of Classification Search
CPC ...................................... G01B 11/26
USPC ..................... 33/274, 286, DIG. 21
See application file for complete search history.

(56) References Cited

U.S. PATENT DOCUMENTS

| 4,441,818 A * | 4/1984 | Wickman | G01B 11/002 33/290 |
| 4,995,169 A * | 2/1991 | Lunden | G01B 11/26 250/237 G |
| 6,105,264 A * | 8/2000 | Phillips | G01B 5/0002 33/288 |
| 6,230,416 B1 * | 5/2001 | Trigilio | B43L 7/027 33/451 |
| 6,823,600 B1 * | 11/2004 | Vaughan | G01C 15/004 33/288 |
| 7,240,437 B1 * | 7/2007 | Moldovan | B25H 7/005 33/286 |
| 7,430,810 B2 * | 10/2008 | Sergyeyenko et al. | G01B 3/56 33/286 |
| 7,454,840 B2 * | 11/2008 | Delfini et al. | B25H 7/00 33/286 |
| 7,484,304 B2 * | 2/2009 | Campagna et al. | G01C 15/004 33/286 |
| 8,387,266 B2 * | 3/2013 | Eddy | A61H 9/0078 33/512 |
| 8,966,776 B2 * | 3/2015 | Kelly | G01C 15/12 33/286 |
| 2006/0016083 A1 * | 1/2006 | Huang | G01C 15/008 33/286 |
| 2006/0213069 A1 * | 9/2006 | Martin | G01B 3/563 33/286 |
| 2007/0079516 A1 * | 4/2007 | Eckstein et al. | G01C 15/004 33/286 |

FOREIGN PATENT DOCUMENTS

| CN | 204831221 U * | 12/2015 | G01B 11/26 |
| EP | 1327854 A1 * | 7/2003 | G01B 11/26 |

* cited by examiner

*Primary Examiner* — R. A. Smith
(74) *Attorney, Agent, or Firm* — Jerry D Haynes; Law Office of Jerry D Hayne

(57) ABSTRACT

An angle square adapter including: a base, where base is attachable to a straight ruler; a series of holes over a top surface of the base; an alignment line between the holes; a laser assembly mountable on the base, where the laser assembly includes a circular measurement portion, a nose portion and a laser mounted on the nose portion; and a measurement scale along one edge of the base, where measurement scale assists in angle alignment. The series of holes preferably includes three holes aligned in a straight line. An angle scale is provided on the perimeter of the circular measurement portion. The angle square adapter may also include a plurality of magnets along one side of the base and a lanyard attached to the base.

5 Claims, 1 Drawing Sheet

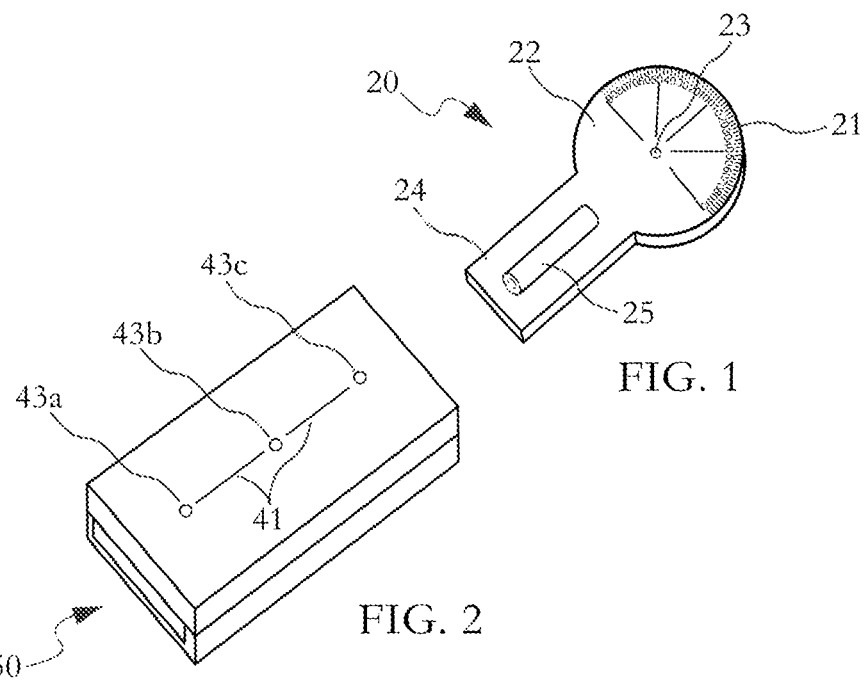
FIG. 1
FIG. 2
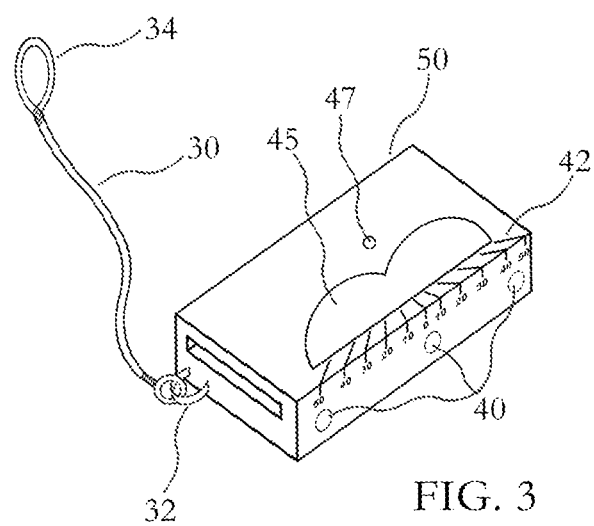
FIG. 3

LASER ANGLE SQUARE ADAPTER

BACKGROUND OF THE INVENTION

Field of Invention

The present invention relates to an angle square adapter that is used to locate angles in a room or other construction site.

Description of Related Art

The construction industry requires workers, plumbers, electrical installers to frequently measure angles for installation and construction purposes. These angles are critical in arranging various structural components into particular areas during construction. Many times workers must measure and calculate these angles using antiquated techniques including pulling strings and marking off angles with hand devices. Although some laser devices are available to address this issue many have not been effective in providing a suitable tool to measure angles in a construction environment. As a result there's a need for an innovative tool that can be provided to make quick field calculations with respect to angles as necessary for construction workers.

SUMMARY OF THE INVENTION

The present invention relates to an angle measurement device including: a base, where base is attachable to a straight ruler; a series of holes over a top surface of the base; an alignment line between the holes; a laser assembly mountable on the base, where the laser assembly includes a circular measurement portion, a nose portion and a laser mounted on the nose portion; and a measurement scale along one edge of the base, where measurement scale assists in angle alignment. The series of holes preferably includes three holes aligned in a straight line. An angle scale is provided on the perimeter of the circular measurement portion. The angle measurement device may also include a plurality of magnets along one side of the base and a lanyard attached to the base.

BRIEF DESCRIPTION OF DRAWINGS

FIG. 1 depicts a laser assembly used in accordance with the present invention.

FIG. 2 depicts a top view of a base of the measuring device.

FIG. 3 depicts a bottom view of the base of the measuring device.

DETAILED DESCRIPTION

The present invention relates to an adjustable angle laser adapter that attaches to a framing square or a straight edge to layout any angle from an adjacent surface. Further the angle laser adapter is available for checking an angle fit using the laser and verifying layouts using angles and a laser. This particular invention is applicable in various fields such as industrial pipe fittings and connectors to locate exact penetrations in walls, roofs or floors using a takeoff gauge on the back along the angle laser adapter. In terms of construction, the angle laser adapter generally may be used for laying out hip roof, rafters, interior wall layouts, flooring and other construction related applications.

The angle laser adapter includes a takeoff gauge on a back side that allows a user to adjust the center line of a pipe from takeoff a fitting. The angle laser adapter includes a center line take off of three-quarters of an inch to be factored into the field measurements. The adjustable angle laser adapter may be calibrated on a framing square using the laser and in conjunction with the framing square to ensure that pinpoint accuracy is provided. The angle laser adapter slides on and locks on to a framing square or straight edge and is used in conjunction with the measuring tool.

As such the angle laser adapter may be used to locate angles that exist or layout and fit to angles that are needed in any construction project. Once the angle laser adapter is secured onto a square or a straight edge, the angle is aligned with an angle degree plate with a centerline marking on the base, sliding the angle laser adapter along the stationary platform until the path for the angle is determined. The angle square adapter is secured with thumb screws adjusted to fit as needed. A set of rare earth magnets are added to the base of the angle laser adapter in order to use the adapter in tight places and on carbon materials such as pipes and steel applications. The angle laser adapter may further include a lanyard to secure the adapter while working at elevated positions.

The angle square adapter according to present invention has a base that includes a series of holes that allow for the mounting and insertion of the laser assembly. The laser assembly includes a scale on the outer perimeter and a laser mounted on the nose portion of the laser assembly. Other features of the present invention include a scale on one side of the base that shows the range of angle measured with the laser.

With respect to FIG. 1, a Laser Assembly 20 is shown. The Laser Assembly 20 attaches to a Base 50 shown in FIG. 2. This Laser Assembly 20 includes a Laser 25 mounted on a Nose Portion 24. This Laser 25 is rotated once placed upon the Base 50. The Base 50 includes a series of Holes 43a, 43b, 43c. The Laser Assembly 20 also has an Opening 23, where a thumbscrew is placed through this opening to mount the Laser Assembly 20 onto the Base 50. Once mounted onto the Base 50, the user may rotate the Laser 25 and direct it to a point to calculate the desired angle based upon the position of the Laser 25 in relation to the base. An Angle Scale 21 is provided on a circular perimeter of the Laser Assembly 20. This circular perimeter is shown on a Circular Measurement Portion 22 of the Laser Assembly 20. Alignment Lines 41 is provided between the holes shown on the Base 50. As a result, the Base 50 is aligned with a straight ruler that is inserted through the Base 50 to provide an accurate pinpoint angle location and confirmation.

With respect to FIG. 3, a bottom view of the Base 50 is depicted. As shown on the bottom view, the opening for the insertion of a straight ruler through the Base 50 is clearly shown. A Measurement Scale 42 is provided along one edge of the bottom of the Base 50. Opening 47 allows for the insertion of the thumbscrew and mounting of the Base 50 onto a straight ruler. Further along one side of the Base 50, Magnets 40 are shown to assist in the movement and adjustment of the Laser Assembly 20.

Section 45 shown along the bottom view is a viewing area depicting the angles available for viewing and confirmation through the Laser Assembly 20. Also shown with this bottom view of FIG. 3 is a Lanyard 30 with a Loop 34 at one end of the Lanyard 30. The Lanyard 30 is attached to a Tab 32, wherein the Lanyard 30 provides a means to secure the angle adapter when working at a higher elevation. The degrees available on the scale are in 2.5 degree increments, the laser direction may be adjusted as needed with the alignment lines shown. Therefore the user is able to verify angles as needed during a construction project. The instant invention has been shown and described in what it considers to be the most practical and preferred embodiments. It is recognized, however, that departures may be made there from within the scope of the invention and that obvious modifications will occur to a person skilled in the art.

What is claimed is:

1. An angle square adapter comprising:
   a. a base, wherein the base is attachable to a straight ruler;
   b. a series of holes over a top surface of the base;
   c. an alignment line between the holes;
   d. a laser assembly mountable on the base, where the laser assembly includes a circular scale, a nose portion and a laser mounted on the nose portion; and
   e. a measurement scale along one edge of the base, where the measurement scale assists in angle alignment.

2. The angle square adapter according to claim 1, where the series of holes includes three holes aligned in a straight line.

3. The angle square adapter according to claim 1, further including an angle scale on the perimeter of the circular scale.

4. The angle square adapter according to claim 1, further including a plurality of magnets along one side of the base.

5. The angle square adapter according to claim 1, further including a lanyard attached to the base.

\* \* \* \* \*